2,856,376

OXIDIZED COPOLYMERS OF ETHYLENE AND β-PROPIOLACTONE AND THEIR PREPARATION

Marvin A. McCall and Harry W. Coover, Jr., Kingsport, Tenn., assignors to Eastman Kodak Company, Rochester, N. Y., a corporation of New Jersey No Drawing. Application May 10, 1954
Serial No. 428,797

12 Claims. (Cl. 260—29.6)

This invention relates to oxidized copolymers of ethylene and β-propiolactone, particularly useful as coating materials, self-polishing wax substitutes, and plastics for molding or extrusion applications.

Waxes, such as paraffin wax, find wide application in many coating applications such as the coating of paper and similar materials. Although the waxes possess considerable utility for such applications, they suffer the inherent disadvantage of being either too soft or too brittle for use over wide temperature ranges. Polyethylene polymers have been used in an attempt to overcome the disadvantages inherent in the use of waxes alone, but such high molecular weight polymers possess relatively high melt viscosities and hence are difficult to use in commercial operations. Attempts have been made to reach a compromise between the waxes and the high molecular weight polymers by employing mixtures of such materials. These mixtures, however, are not satisfactory since the mixtures retain many of the objectionable characteristics of the individual components.

Waxes, such as carnauba wax, also find utility in the preparation of self-polishing emulsions which deposit a hard glossy film. Such waxes are relatively expensive, however, and have a tendency towards undue brittleness which limits their service life. Again, attempts have been made to replace part or all of the naturally occurring wax with polymeric materials. In many cases, the polymeric materials are not readily compatible with the waxes and, when used alone, are difficult to emulsify. Similar incompatibility problems have arisen in attempts to prepare mixtures of paraffin waxes with polymeric materials for use in molding operations.

Various polymeric materials, waxes, resins, and mixtures of two or more of such materials have also been used in molding and extrusion applications, but the mixtures usually are difficult to process because of incompatibility.

It is accordingly an object of this invention to provide new and improved polymeric compositions which can be prepared by simple and straightforward processes to give products which can be varied over a relatively wide range of properties whereby the products can be used for such various applications as coating materials, self-polishing emulsions, extruding materials, molding materials, and wax additives, substitutes, or extenders.

Another object of the invention is to provide a new class of oxidized copolymers of ethylene and β-propiolactone.

Other objects will be apparent from the description and claims which follow.

These and other objects are attained by means of this invention which comprises copolymerizing from 1 to 65% by weight of β-propiolactone with from 99 to 35% by weight of monomeric ethylene until a polymeric product having an average molecular weight in the range of 1500 to 20,000 is obtained, and thereafter oxidizing this copolymer to an acid number in the range of 5 to 75. By a suitable choice of the reactant proportions, and by varying the molecular weight and degree of oxidation of the copolymer, a variety of products can be obtained ranging from those which are particularly suitable for use in coating applications or in self-emulsifying emulsions to those which are particularly adapted for use as extrusion or molding materials. Heretofore, β-propiolacetone has been homopolymerized to form linear polyesters by heating the lactone with a suitable condensation catalyst in the presence of a solvent as shown in Kung U. S. Patent 2,361,036. Such condensation polymers, however, are quite different in physical and mechanical properties from the copolymers of this invention. The preparation of copolymers of β-propiolactone with unsaturated monomers such as ethylene is disclosed and claimed in Maggfin et al. U. S. Patent 2,487,885. The present invention is concerned with oxidized derivatives of such copolymers, however, having an acid number in the range of 5 to 75, whereby the properties of the copolymers are greatly modified. Thus, for example, the oxidized copolymers are very readily emulsified in water in contrast to the unoxidized polymers which are difficult to emulsify.

The copolymers are readily prepared by heating a mixture of 1 to 65% by weight of β-propiolactone with from 99 to 35% by weight of monomeric ethylene under a pressure of from about 2000 to about 30,000 p. s. i. in the presence of a free radical catalyst. This copolymerization can be carried out either in a batchwise process or in a continuous reactor as desired. The conditions employed for the copolymerization generally parallel those used for preparing unmodified high molecular weight polyethylene polymers. Unlike the unmodified high molecular weight polyethylene polymers, however, the copolymers of this invention have a relatively thin melt viscosity and exhibit good compatibility with such materials as paraffin, ink oils, resins, and other protective coating materials, particularly when oxidized as described hereinafter. The oxidation of the copolymers can be carried out in any desired manner. The oxidation is preferably effected by blowing air through the molten copolymer in the presence or absence of an oxidation catalyst such as potassium permanganate, finely divided metals such as iron, lead, or manganese, titanium or manganese stearates, or mixtures of these or similar oxidation catalysts. The air blowing alone will accomplish the desired oxidation, although the use of catalysts is preferred since the rate of oxidation is thereby increased. The oxidized products having an acid number in the range of 5 to 75 have greatly enhanced properties such as the ability to be readily emulsified in water to form an almost transparent emulsion which is self-polishing and which produces a hard glossy film equal to that produced by carnauba wax emulsions.

The copolymerization is desirably effected at an elevated temperature and in the presence of a free radical catalyst. The temperature employed can be varied depending upon the particular catalyst which is used, and the temperature desirably is one at which the free radical catalyst effectively decomposes. Any of the per-catalysts such as peroxides, perborates, persulfates, and the like can be used in practicing the invention. When a compound such as benzoyl peroxide is employed as the catalyst, a temperature of about 90° C. is satisfactory. With a catalyst such as di-t-butyl peroxide, a temperature of about 130° C. gives optimum results, while a temperature of about 140° C. is desirably employed with cumene hydroperoxide. The effective temperatures necessary for use of these and similar catalysts is well known in the art, and it is not intended that the invention shall be limited to any particular temperature or catalyst since any of the well known free radical catalysts are suitable. Similarly, the amount of catalyst can be varied in accordance with usual polymerization practice. If desired, the copolymerization can be carried out in an added solvent such as methyl alcohol, although such solvents are not necessary.

Relatively pure monomeric ethylene is desirably used in practicing the invention, and the reaction vessel is desirably purged with ethylene to remove residual air. The requisite polymerization pressure is obtained by pumping ethylene into the autoclave or other reactor until the desired pressure of, for example, 1500 p. s. i. to 40,000 p. s. i. is obtained. The pressure is desirably maintained during the course of the polymerization by pumping ethylene into the reactor to replace the ethylene taken up by the copolymerization. Th polymerization can be allowed to proceed until no more ethylene is taken up, or it can be stopped at an intermediate point in the polymerization in order to give products of the desired molecular weight within the range of 1500 to 20,000.

Compositions having average molecular weights in the range of 1500 to 5200 have been found to be particularly valuable as coating materials, coating material additives, wax substitutes, and the like. Best results are obtained within this molecular weight range when the polymer contains from 1.5 to 15% by weight of combined β-propiolactone, and from 98.5 to 85% by weight of combined ethylene. Compositions having an average molecular weight in the range of 5200 to 20,000 and containing from 1 to 65% by weight of combined β-propiolactone and from 99 to 35% by weight of combined ethylene have been found to be most useful as molding or extruding compositions, or as additives to other resins, molding and extruding materials. The oxidized copolymers embodying this invention range in consistency from heavy greases to hard solid substances. They are characterized by low melt viscosities and sharp melting point ranges which are usually less than 3° C. These oxidized copolymers are compatible with most of the ink oils, paraffin, vegetable and mineral waxes, and similar materials. When ready emulsification is desired, the acid number of the oxidized copolymer is preferably in the range above 6, or more desirably 8, although the compositions having an acid number within the range of 5 to 75 are suitable. In some cases, when using a catalyst which liberates oxygen at the reaction temperature, the copolymer obtained from the initial step may be partly oxidized as it is obtained and can be used directly, or further oxidized as desired.

The invention is illustrated by the following examples of certain preferred embodiments thereof. It will be understood, however, that the examples are included merely for purposes of illustration, and that it is not intended that the invention shall be limited thereby unless otherwise specifically indicated.

Example 1

A stainless steel 310 cc. autoclave was charged with 28 g. of β-propiolactone, 40 g. of distilled methyl alcohol, and 2.0 g. of di-t-butyl peroxide. The autoclave was purged with ethylene to remove the residual air and then pressured with ethylene to 1500 p. s. i. and heated to 130° C. The pressure was adjusted to 4800 p. s. i. at the reaction temperature by pumping in additional ethylene. This temperature (130° C.) and pressure (4800 p. s. i.) was maintained for eight hours. The crude yield of copolymer was 125.5 g. which was pulverized in methyl alcohol and then filtered to give 100 g. of processed product. This copolymer had a molecular weight of 2500 and contained 2.8% by weight of combined β-propiolactone. The ring and ball softening point was 108° C., and the penetration hardness was 0–0.5 using a 100 g. weight for 5 seconds. The product as obtained had an acid number of 8, indicating that it had been partially oxidized during the copolymerization. The product was partially compatible with ink oils and was completely compatible with oleic acid. It had a thin melt viscosity and a cloud point with 10% paraffin of 189° F. It could be partially emulsified or used in quantities up to 50% by weight with carnauba wax to give a self-polishing emulsion which produced a hard glossy surface. This product was then melted and blown with clean, dry air at 125–135° C. for 8 hours with stirring. The melt was then poured out, stirred into methyl alcohol, and filtered to give 80 g. of processed product. This product had a ring and ball softening point of 105° C. and a penetration hardness of 0.5 to 1 using a 100 g. weight for 5 seconds. The waxy product had an acid number of 25–27 and was easily emulsified without the use of any other natural or synthetic waxes to form a transparent, self-polishing emulsion.

Example 2

A stainless steel autoclave was charged with 114 g. of β-propiolactone and 2.0 g. of di-t-butyl peroxide. The autoclave was purged with ethylene to remove the residual air, and then pressured to about 1200 p. s. i. with ethylene and heated to 130° C. The pressure was adjusted to 4800 p. s. i. by pumping in more ethylene after the reaction temperature was reached. The reaction conditions were maintained for 8 hours, and a yield of crude product of 159 g. was obtained. This product was ground, washed with methyl alcohol, and dried to give a yield of processed product of 120 g. The product was an oxidized copolymer having a molecular weight of 3500 and containing approximately 6.5% by weight of β-propiolactone. It had a ring and ball softening point of 104° C., a penetration hardness of 4, and gave self-polishing emulsions without the use of any other natural or synthetic wax. By blowing air through the melt as described in the preceding example, the acid number was raised further to give a product having a somewhat lower softening point, a higher penetration hardness, and better emulsifying characteristics.

Example 3

A 4450 cc. capacity stainless steel autoclave was charged with 285 g. of β-propiolactone, 400 g. of methyl alcohol, and 20 g. of di-t-butyl peroxide. The autoclave was purged with ethylene to remove some residual air, pressured with ethylene to 1200 p. s. i., and heated to 130° C. The pressure was then adjusted to 4800 p. s. i. by pumping in more ethylene at the temperature of 130° C. This temperature and pressure was maintained for 8 hours to give 1718 g. of crude product having an average molecular weight of 5000. The product after being refined in methyl alcohol and a ring and ball softening point of 110° C. and a penetration hardness of 0–0.5 using a 100 g. weight for 5 seconds. The polymer contained 5.35% by weight of combined β-propiolactone and had a cloud point with 10% paraffin of 184° F. The acid number of the copolymer from the original reaction was 10. A 1000 g. portion of this product was melted, and 0.5 g. of finely divided potassium permanganate was added to the melt as an oxidation catalyst. The mixture was stirred and blown with air for 8 hours at 125–135° C. The resulting material, which now had an acid number of 46–47, was processed by pouring it into vigorously stirred methyl alcohol followed by filtering of the product. The resulting processed product weighed 950 g. and had a penetration hardness of 0–0.5 using a weight of 100 g. for 5 seconds. The product emulsified easily in water without the use of any other natural or synthetic waxes to form a transparent self-polishing emulsion.

Example 4

A stainless steel autoclave was charged with 25 g. of β-propiolactone, 50 g. of distilled methyl alcohol, and 210 g. of di-t-butyl peroxide. The autoclave was purged with ethylene to remove the residual air, then pressured to 5000 p. s. i. with ethylene (containing less than 0.2% oxygen) and heated to 130 C. The pressure was adjusted to 25,000 p. s. i. and held at this pressure by pumping ethylene into the system as it was used up in the polymerization. The temperature and pressure was maintained for 8 hours, at which time the ethylene absorption had essentially stopped. The resulting product weighed 200 g. and was processed by melting and pouring into forms. The copolymer had a molecular weight of approximately 20,000 (by viscosity measurements) and contained 10% combined β-propiolactone. It had a penetration hardness of 0 using a penetrometer with a 200 g. weight for 5 seconds. This high molecular weight polymer could then be oxidized by blowing air through the melt as described.

*Example 5*

A copolymer having a high β-propiolactone content was prepared as in the preceding examples using a polymerization mixture of 800 g. of β-propiolactone, 16 g. of di-t-butyl peroxide and 4800 pounds ethylene pressure. The resulting copolymer which was oxidized by blowing with air had an average molecular weight of about 2100 and contained approximately 63% by weight of combined β-propiolactone. The product had a thin melt viscosity and a ring and ball softening point of about 70° C.

Thus by means of this invention a highly useful group of oxidized copolymers are readily obtained which serve as coating materials in the coating of paper and similar substances, as self-polishing emulsions, and as molding and extruding materials. The properties of the products can be varied widely as desired by a suitable choice of the reaction proportions and reaction conditions within the limitation defined herein and depending upon the particular properties which are desired. The oxidized copolymers can be used alone or in admixture with waxes, resins, ink oils, fillers, pigments, and similar materials in accordance with well known practices.

The invention has been described in considerable detail with particular reference to certain preferred embodiments thereof, but it will be understood that variations and modifications can be effected within the spirit and scope of the invention as described hereinabove, and as defined in the appended claims.

We claim:

1. The product resulting from air-blowing a molten copolymer of from 1 to 65% by weight of β-propiolactone and from 99 to 35% by weight of ethylene, said polymer and said product both having an average molecular weight in the range of 1500 to 20,000 and said product having an acid number in the range of 5 to 75.

2. A composition of matter resulting from air-blowing a molten copolymer of from 1.5 to 15% by weight of β-propiolactone and from 98.5 to 85% by weight of ethylene, both said composition and said copolymer having an average molecular weight in the range of 1500 to 5200 and said composition having an acid number in the range of from 5 to 75.

3. A composition of matter resulting from air-blowing at 125–135° C. a copolymer of from 1 to 65% by weight of β-propiolactone and from 99 to 35% by weight of ethylene, both said composition and said copolymer having an average molecular weight in the range of from 5200 to 20,000 and said composition having an acid number of 5 to 75.

4. A self polishing aqueous emulsion containing the product resulting from air-blowing a molten copolymer of from 1.5 to 15% by weight of β-propiolactone and from 98.5 to 85% by weight of ethylene, said copolymer and said product each having an average molecular weight in the range of 1500 to 5200 and said product having an acid number in the range of 8 to 75.

5. A polymeric composition capable of being emulsified in water and comprising the product resulting from air-blowing at 125–135° C. a copolymer containing about 3% by weight of combined β-propiolactone and about 97% by weight of combined ethylene, said copolymer and said product each having a molecular weight of about 2500 and said product having an acid number above 25.

6. A polymeric composition capable of being emulsified in water and comprising the product resulting from air-blowing at 125–135° C. a copolymer containing about 5% by weight of combined β-propiolactone and about 95% by weight of combined ethylene, said copolymer and said product each having a molecular weight of about 5000 and said product having an acid number of about 45 to 50.

7. A material having a molecular weight of about 20,000 and having an acid number in the range of 5 to 75 and prepared by air-blowing at 125–135° C. a copolymer having a molecular weight of about 20,000 and containing about 10% by weight of combined β-propiolactone and about 90% by weight of combined ethylene.

8. A material having a molecular weight of about 2100 and having an acid number in the range of 5 to 75 and resulting from air-blowing at 125–135° C. a copolymer having a molecular weight of about 2100 and containing about 63% by weight of combined β-propiolactone and about 37% by weight of combined ethylene.

9. The method which comprises air-blowing a molten copolymer of 1–65% by weight of β-propiolactone and 99–35% by weight of ethylene, said copolymer having an average molecular weight in the range of 1500–20,000, said air-blowing being continued until said copolymer has an acid number of 5–75.

10. The method which comprises air-blowing at 125–135° C. a molten copolymer of 1.5–15% by weight of β-propiolactone and 98.5–85% by weight of ethylene, said copolymer having an average molecular weight in the range of 1500–5200, said air-blowing being continued until said copolymer has an acid number of 5–75.

11. The method which comprises air-blowing at 125–135° C. a molten copolymer of 1–65% by weight of β-propiolactone and 99–35% by weight of ethylene, said copolymer having an average molecular weight in the range of 5200–20,000, said air-blowing being continued until said copolymer has an acid number of 5–75.

12. The method which comprises air-blowing at 125–135° C., in the presence of an oxidation catalyst, a molten copolymer of 1–65% by weight of β-propiolactone and 99–35% by weight of ethylene, said copolymer having an average molecular weight of 1500–20,000, said air-blowing being continued until said copolymer has an acid number of 5–75.

References Cited in the file of this patent

UNITED STATES PATENTS

| | | |
|---|---|---|
| 2,318,669 | Carr | May 11, 1943 |
| 2,487,885 | Magoffin | Nov. 15, 1949 |
| 2,554,259 | Mikeska | May 22, 1951 |